United States Patent [19]

Allen

[11] Patent Number: 4,887,753
[45] Date of Patent: Dec. 19, 1989

[54] VISOR CLIP FOR MOUNTING RADAR DETECTOR

[75] Inventor: Paul M. Allen, Cincinnati, Ohio

[73] Assignee: Cincinnati Microwave, Inc., Cincinnati, Ohio

[21] Appl. No.: 274,003

[22] Filed: Nov. 21, 1988

[51] Int. Cl.⁴ .............................................. A45F 5/02
[52] U.S. Cl. .................................. 224/312; 224/42.01; 224/42.46 R; 224/252; 24/3 J; 24/3 L; 24/543; 455/351; 455/346
[58] Field of Search ...................... 224/273, 275, 42.01, 224/309, 311, 312, 42.42, 42.45 R, 42.46 R, 252, 151, 253; 455/344, 345, 346, 377, 351; 24/3 L, 327, 331, 67.11, 543, 544, 3 J

[56] References Cited

U.S. PATENT DOCUMENTS

| | | | |
|---|---|---|---|
| 2,211,879 | 7/1940 | Cave | 281/45 |
| 2,377,225 | 5/1945 | Gisleson | 40/643 |
| 2,637,128 | 5/1953 | Weeks | 40/643 |
| 2,714,036 | 7/1955 | Gentile | 296/97.6 |
| 2,848,116 | 8/1958 | Odom | 211/89 |
| 3,430,299 | 3/1969 | Copen | 24/306 |
| 3,956,701 | 5/1976 | James Jr. et al. | 455/351 X |
| 4,083,481 | 4/1978 | Selinko | 224/252 |
| 4,280,223 | 7/1981 | Roettle et al. | 455/228 |
| 4,299,344 | 11/1981 | Yamashita et al. | 455/351 X |
| 4,325,142 | 4/1982 | Nakazawa | 455/346 X |
| 4,536,925 | 8/1985 | Boothe et al. | 455/351 X |
| 4,590,641 | 5/1986 | Läutenschlager et al. | 16/238 |
| 4,635,836 | 1/1987 | Mooney et al. | 224/247 |
| 4,701,979 | 10/1987 | Salice | 16/238 |
| 4,741,074 | 5/1988 | Budano II et al. | 24/3 J |

FOREIGN PATENT DOCUMENTS 139015 5/1979 Fed. Rep. of Germany.

OTHER PUBLICATIONS

Owner's Manual, "Visor Clip Mounting", Cincinnati Microwave, Inc. Escort ®.
Road & Track ®, "Finally A Better Way To Mount Your Radar Detector", V. Polak, Inc., UK May 1981.

Primary Examiner—Ernest G. Cusick
Attorney, Agent, or Firm—Wood, Herron & Evans

[57] ABSTRACT

A visor clip for mounting a police radar detector to the visor of a vehicle having a parallelogram shaped linkage pivotally connected to the top of the detector supporting base. A clip arm is provided at the upper side of the linkage for engaging the top of a visor. The linkage is spring biased forward and downward. The clip arm is longer than the base so as to clamp the visor between the arm and the detector case, tightening the detector to the base to which the detector is removably attached. The tightening action of the arm operates to press against the detector case to hold the clip onto the detector when the combination is removed from the visor. Friction enhancing horizontal ridges on the underside of the forward end of the clip arm urge the linkage backward to raise the clip arm upward when the combination is pushed onto the edge of a visor.

11 Claims, 2 Drawing Sheets

VISOR CLIP FOR MOUNTING RADAR DETECTOR

FIELD OF THE INVENTION

The present invention relates to radar detector mounting devices and more particularly to a novel clip for removably attaching a police radar detector to the visor of an automobile.

BACKGROUND OF THE INVENTION

Police radar detectors are devices for receiving and detecting signals generated by police radar units and generating an audible and/or visual warning signal in response thereto to provide early indication of the presence of the signals to the driver of an automobile. Typically, these devices are installed within the passenger compartment of an automobile, truck or other road vehicle, and are located within the view and reach of the driver. For best operation, these detectors should be installed within the windshield area, preferably high on the windshield and in a horizontal plane with the front end of the receiver which houses the antenna oriented toward the front of the vehicle. Most commonly, these devices are held in position through means of some form of bracket or attachment device secured to the dashboard, windshield or visor of the vehicle.

Police radar receivers present in parked automobiles pose a temptation for thieves. While radar receivers must be adequately supported within view of the windshield when in use so that they are not shielded by the metal parts of the vehicle, their visibility from outside of the vehicle while the vehicle is parked increase the risk of theft and break-in. Accordingly, they should be mounted so as to be easily detachable from their mounts in order to be concealed in or removed from the automobile when the automobile is left unattended. It is thus important for the mounting devices for radar detectors to allow for the quick and easy removal of the detectors when not in use. Small and compact radar detectors can easily be concealed by their owners when vacating the vehicle, and are small enough and light enough to be taken with them when they leave. Freedom from attempted theft is, however, compromised if the detector is not readily removable from the mounting device. The more easily the mounting device is removable from the detector the greater the convenience to the user in removing the detector when it is not in use.

However, the ease in removing the detector from the mounting device cannot be carried to the extreme that security of attachment is compromised such that its stability during use is lessened. Though it is made to be easily removable from its mount, the radar detector must be held securely enough so that it will not fall due to vibrations or unexpected bumps or other movements encountered by the vehicle. Were that to occur during operation of the automobile, damage could be encountered by the detector or a distraction or hazard to the driver could result.

When the detector is detached from the mounting device, the mounting device should be able to remain attached to the vehicle if the driver so desires. However, the presence of the mounting device may nonetheless attract a thief by its suggestion that a receiver may be secreted in the vehicle. Thus, the driver should have the option of easily removing the mounting device and carrying or storing it with the receiver. Thus, it is desirable that the mounting device, when attached to the receiver, not unreasonably add to the size of the receiver or alter its shape to make it difficult to carry and/or store upon leaving the vehicle. Furthermore, in such circumstances, it is important that the clip remain attached to and not become separated from the detector, otherwise it may become lost or misplaced.

Clips for mounting police radar detectors to automobile visors have been previously employed in the past. Such visor clips can effectively support the receiver high and behind the windshield and in a space convenient to the driver. Such clips, however, have not been fully capable of accommodating visors of a wide range of stiffnesses, thicknesses and shapes encountered in various vehicles. Furthermore, the prior art devices have not satisfactorily provided the answers to other problems in the mounting of police radar detectors, such as the ability to enable the driver to attach and remove the receiver, with or without the mount attached, to and from the visor with one hand.

SUMMARY OF THE INVENTION

It is accordingly an objective of the present invention to provide a visor clip mount for a police radar detector which permits the easy removal of the detector from the mounting device while at the same time enhancing the security and stability of the mounting of the receiver to the visor during use. It is also an objective of the present invention to provide a visor clip which can be easily removed from or attached to an automobile visor, particularly with one hand. It is a further objective of the present invention to provide a visor clip for a police radar detector which will securely hold the detector to the visor of a vehicle given a wide range of the visor sizes, thicknesses and stiffnesses which are encountered in use.

A further advantage of the present invention is that, when the detector is removed with the visor clip, the gripping end of the spring-biased clamp arm is biased to its closed or collapsed position and urged against the upper surface of the detector, imparting a bending moment to the junction between the detector and the clip base, increasing the frictional forces between the two and assisting in holding the clip to the detector. Furthermore, in this collapsed clamp arm position, the clip exhibits a low profile with respect to the detector, presenting a smooth outer surface which adds little to the size of the combined structure. This renders the device easy to carry and transport, such as in the pocket of the driver, or to otherwise store.

According to the principles of the present invention, a visor clip for a police radar detector is provided which can be attached to or removed from the detector or from the visor with a minimum of operator effort, which will permit the detector to be attached to an automobile visor notwithstanding wide variations in visor design and configuration and which will apply cooperating forces between the clip, the visor and the detector which will hold the detector securely in the clip and against the visor during use. Also provided is a visor clip which will serve to tighten the connection between the clip and the receiver when detached from the visor and also will form a compact package with the receiver for transport and storage.

In the illustrated embodiment of the present invention, a visor clip for a police radar detector is provided which has a) a base removably engageable with a radar detector casing by a simple slide or snap action, and b)

a clamp arm linked to the top of the base and which is at all times oriented parallel to the base, whether the clip is detached from the visor or it is gripping visors of varying thickness. A parallelogram type linkage, comprising two parallel legs each pivotally attached to the base and each pivotally attached to the clamp arm, provide the clamp arm of this invention with the desired continuous parallel disposition relative to the base. The linkage includes a helical spring to bias the clamp arm down against the top of the visor when clipped to the visor and against the receiver housing when removed from the visor.

In the preferred embodiment, the clamp arm has a dimension longer than that of the base so that its forward end presses against the top of the visor and clamps the visor, not between the arm and the base, but between the arm and the upper surface of the detector held by the base. The combined length of the clamp arm and the supporting legs is such that the gripping end of the arm bears toward the receiver upper surface during any position of the clamp arm which might result as the device is deflected to accommodate visors of various sizes, thereby always clamping the visor between the clamp arm and the receiver housing. In addition, when the receiver is removed from the visor along with the clip, the outer gripping end of the clamp arm bears on the upper surface of the receiver enhancing the frictional gripping action between the receiver housing and the base of the clip which is in sliding engagement therewith. The end of the clamp arm projects upwardly to form a slight lip and is provided with friction enhancing ridges which assist the user in spreading the clip when pushing it onto a visor with one hand.

BRIEF DESCRIPTION OF THE DRAWINGS

These and other objectives and advantages of the present invention will be more readily apparent from the following detailed description of the drawings in which.

DESCRIPTION OF THE PREFERRED EMBODIMENTS

Figure 1:
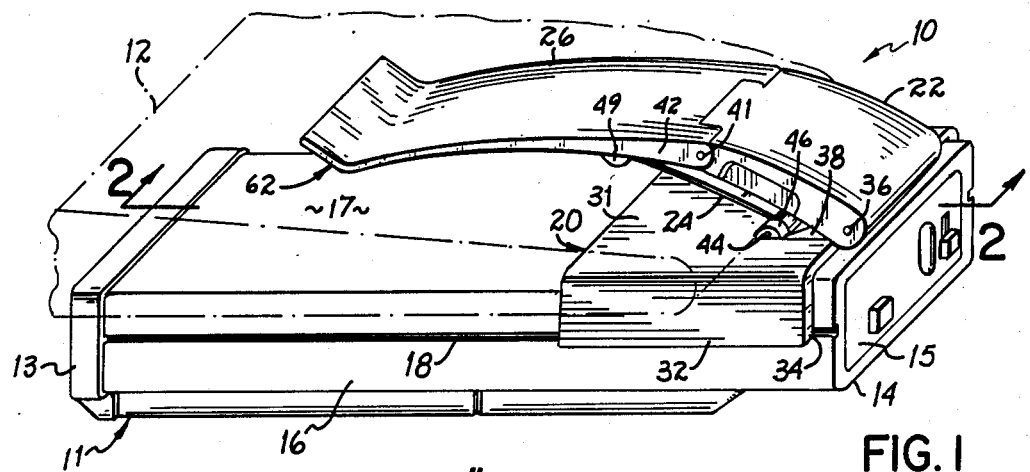
FIG. 1 is a perspective view of a visor mounting clip and supported radar detector embodying principles of the present invention and shown attached to a vehicle visor shown in phantom in the figure.

Referring to FIG. 1, a visor mounting clip is shown in combination with a police radar detector 11 attached to a visor 12 of an automobile in accordance with the principles of the present invention. The detector 11 has a forward end 13 which, when mounted, faces the front of the automobile, and a rear end 14 holding the panel 15 which carries the controls and indicators to be maintained in the view and reach of the driver. Enclosing the detector and having a length spanning from the front end 13 to the rear end 14 is the receiver housing or case 16 having an upper surface 17. On the opposite sides of the case 16 are respective ones of a pair of longitudinal grooves 18 which extend the length of the unit from the front end 13 to the rear end 14. The clip 10 includes a molded plastic base 20 and a parallel linkage assembly which comprises a pair of legs 22 and 24, and a molded plastic clamp arm 26.

Figure 4:
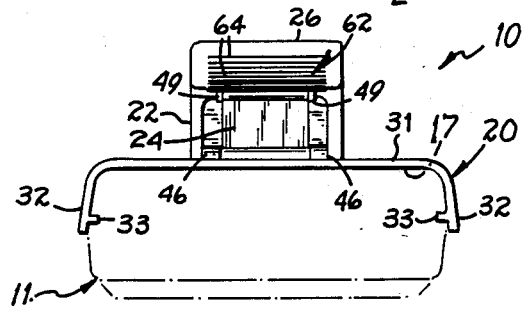
FIG. 4 is an elevational end view of the clip and detector viewed from the forward end.

As is better seen with reference to FIG. 4, the base 20 includes a planar upper section 31 and a pair of downwardly extending side sections 32, 32 integrally formed with the top section 31 and connected at the side edges thereof. A pair of horizontally extending rails 33 are integrally formed at the inside surfaces near the lower ends of the sides 32. As is shown in FIG. 4, the rails 33 slidably fit into the grooves 18 of the detector housing 16 and hold the upper surface 31 into intimate contact with the upper surface 17 of the case 16 of the detector 11. The base 20 thus presents an inverted U-shaped cross-section formed integrally of a plastic material and possessing a degree of resiliency such that it may be clipped onto the top of the detector 11 so that the rails 33 snap into the grooves 18. The base 20 will not however fit so tightly around the case 16 of the detector 11 so as to interfere with the driver's ability to slide the unit forward and backward with ease with one hand. It will nonetheless provide sufficient friction to prevent the receiver from sliding without restriction during normal driving conditions.

Figure 2:
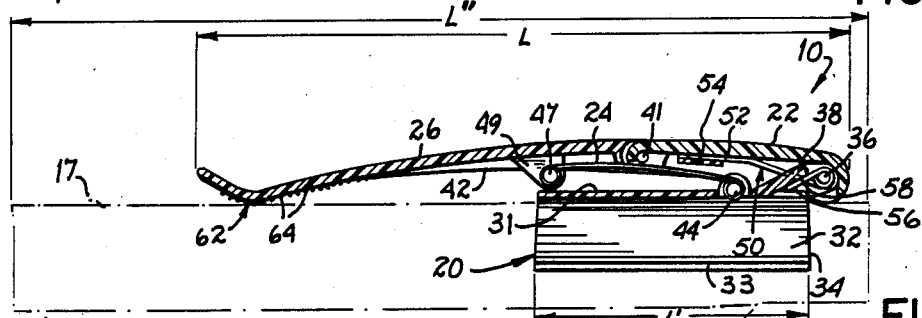
FIG. 2 is an elevational cross-sectional view through the visor clip of FIG. 1 illustrating the radar detector in phantom lines and showing the position of the clip components when both the clip and detector are removed from the visor.
Figure 3:
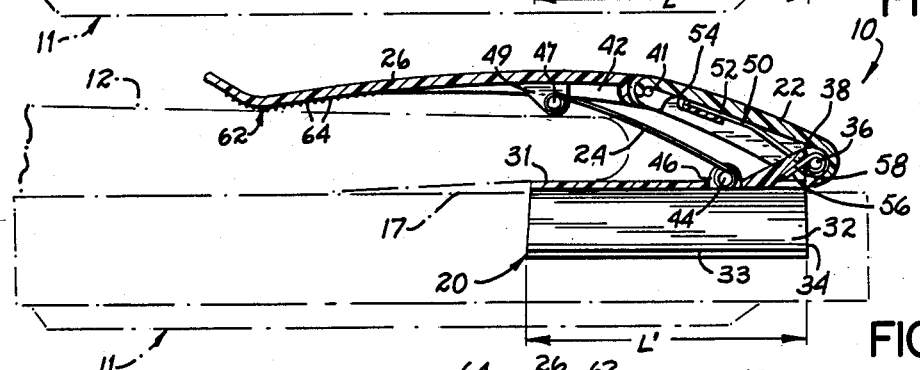
FIG. 3 is a cross-sectional elevational view similar to FIG. 2 showing the clip attached to the automobile visor as shown in FIG. 1.
Figure 5:
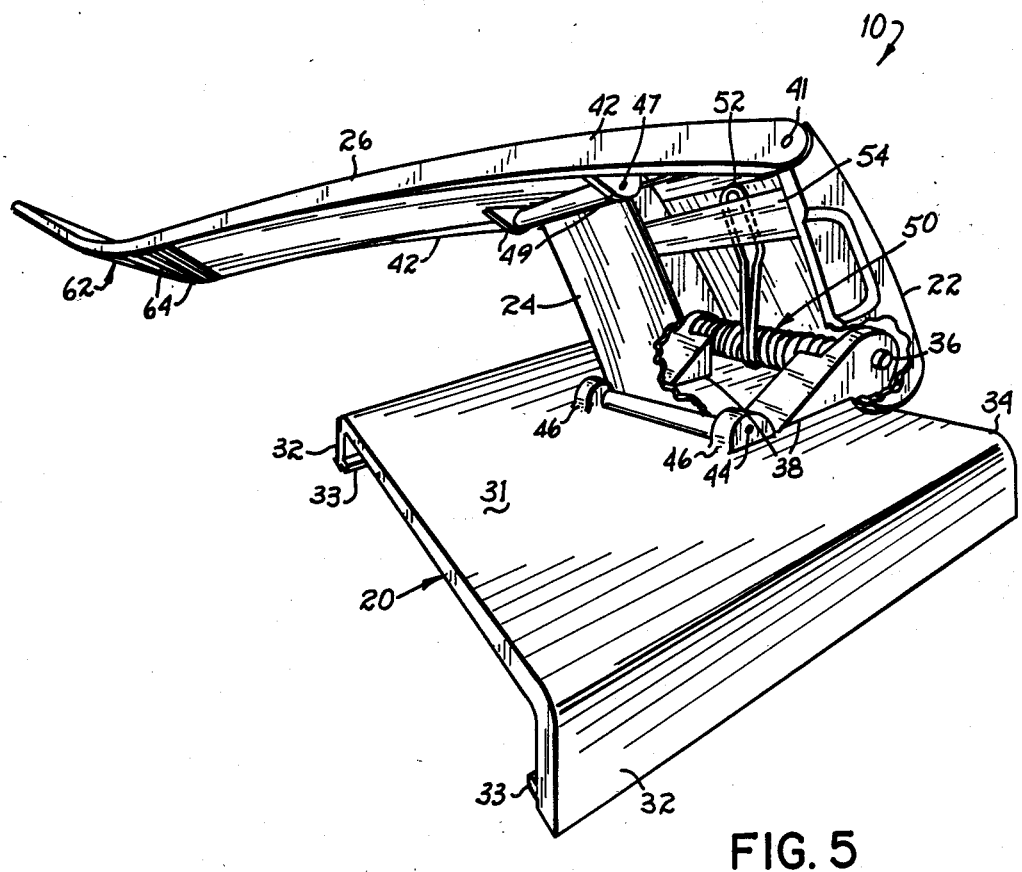
FIG. 5 is a perspective view of the visor clip, partially cut away, to show in more detail the clip arm linkage components and spring.

With reference particularly to FIGS. 2, 3 and 5, the upper and rearward leg 22 is shown pivotally connected to the rear edge 34 of the upper section 31 of the base 20 with a horizontal pivot pin 36. The pin 36 extends horizontally and parallel to the rear edge 34 of the upper surface section 31 of the base 20 and is supported thereon in a pair of horizontally spaced upwardly standing lugs 38 integrally formed on the upper surface 31 base 20. The rear leg 22 is also formed of molded plastic. At its upper end the leg 22 is pivotally attached at pivot pin 41 to the rear end of the clamp arm 26. The clamp arm 26 has a pair of downwardly extending side rails 42 integrally formed therefore for supporting the ends of the pivot pin 41 and for structurally reinforcing the clip arm 26.

The forward leg 24 is connected between the base 20 and the clamp arm 26. The leg 24 is pivotally attached to the upper surface of top section 31 of the base 20 through a horizontal pivot pin 44 extending parallel to the pin 36 and pivotally supported at its opposite ends by a pair of upwardly standing lugs 46 which are integrally formed on the surface 31. At its upper end, the forward leg 24 is also pivotally connected through a pivot pin 47 to the underside of the clip arm 26. The pivot pin 47 is parallel to and in the horizontal plane of the pivot pin 41 at the rear end of the arm 26. The pin 47 is pivotally supported at its opposite ends by a pair of downwardly extending lugs 49 integrally formed on the lower surface of the clip arm 26. The lugs 46 and 49 are spaced from the lugs 38 and 42, respectively, an equal distance. As such, the forward leg 24 is maintained approximately parallel at all times to the rear leg 22. In addition, the forward leg 24 is of approximately equal length to that of the rear leg 22. As such, the clamp arm 26 will be maintained at all times in a horizontal plane parallel to the upper section 31 of the base 20.

The helical spring 50 is wound about the pin 36. The helical spring 50 is provided with a center loop 52 which hooks onto a bar 54 formed on the forward and underside of the rear leg 22 to urge the leg 22 forward (leftwardly as viewed in FIG. 5) thereby urging both legs 22 and 24 and the clip arm 26 forward and downward toward the top surface 17 of the receiver case 16. As will be better seen in FIGS. 2 and 3, the outer ends 56 of the spring 50 hook under stops 58 integrally formed with the lugs 38. As such, the spring 50 urges the two legs 22 and 24 and the clamp arm 26 forward and downward to a position which is almost flush with the top 17 of the detector 11, as can be seen in FIG. 2. The forward leg 24 is made of a thin spring metal material so that it possesses sufficient strength but nonetheless thinness to allow the combination of the leg 22 and the arm 26 to collapse flush against the upper surface 17 of the detector 11.

The forward end of the arm 26 is provided with a clamping surface 62 which depresses against the upper surface of the visor 12 when attached thereto as shown in FIGS. 1 and 3, and in addition against the upper surface 17 of the detector 11 when the clip 10 is removed from the visor 12. This assists in tightening the mounting between the receiver 11 and the visor 12 and the receiver 11 and the clip assembly 10.

The under surface 62 has formed thereon spaced horizontal ridges 64 which increase the frictional engagement between the arm 26 and the visor 12 to prevent slippage. The ridges 64 also serve to increase this frictional force when the clip 10 is being pushed onto the visor 12, urging the clip 10 to open by moving the clamp arm 26 backward and upward, thus making it easier for the driver to mount the clip 10 to the visor 12 with one hand.

It can be seen in FIG. 2 that the combined length L of the leg 22 and clip arm 26 is less than the length L" of the upper surface 17 of the detector 11 so that the clamping surface 62 will always engage the surface 17 or clamp the visor thereagainst when the clip 10 is mounted to the detector 11. Similarly, as shown in FIG. 3, the length of the clamp arm 26 itself exceeds the length L' of the base 20 so that, even when the legs 22 and 24 are in their fully upstanding positions, the clamping surface 62 will nonetheless clamp the visor 12 directly against the upper surface 17 of the detector 11.

Having described the invention, the following is claimed:

1. The combination comprising:
   a visor clip for securing a police radar detector to the underside of a visor of a vehicle of a thickness unspecified over a predetermined range;
   a police radar detector having an upper planar surface, a front end disposed to be oriented toward the front of said vehicle, and a rear end;
   said visor clip comprising a base removably securable on said upper surface of said detector, said visor clip having an outer surface and an inner surface;
   said visor clip further comprising a parallel linkage assembly including a first leg and a second leg each having upper and lower ends, each said first and second leg extending upwardly from, and having its lower end hingedly connected to, said outer surface of said base, said first leg being connected to said outer base surface so as to pivot about a first horizontal axis parallel to said rear end of said detector, said second leg being connected to said outer base surface so as to pivot about a second horizontal axis located on said base a fixed distance forward of said first axis, said parallel linkage assembly also including a clamp arm having a forward tip and a back end, said clamp arm being hingedly attached at its back end to said upper end of said first leg and being hingedly attached to said upper end of said second leg at a point on said arm displaced forwardly of the back end of said arm a distance equal to said fixed distance, whereby a parallelogram is formed by said legs and said base and said arm with said arm being maintained in parallel relationship with said base as it is movable toward and away from said base.

2. The combination of claim 1 further comprising means for biasing said linkage assembly forward and downward toward said base.

3. The combination of claim 2 wherein said tip is angled forwardly and upwardly for causing said clamp arm to be urged backward and upward against the force of said biasing means when said combination is pushed forward onto said visor with said visor between said tip and the upper surface of said receiver.

4. The combination comprising:
   a visor clip for securing a police radar detector to the underside of a visor of a vehicle of a thickness unspecified over a predetermined range,
   a police radar detector having an upper planar top surface, a front end disposed to be oriented toward the front of said vehicle and a rear end, said surface extending the length of said detector between said ends,
   said visor clip comprising a base removably securable on said upper planar top surface of said detector and having a front and a rear edge and inner and outer surfaces, said base being positionable on said top surface such that said edges lie between said ends and said top surface extends forward of said rear edge at least a predetermined distance;
   said visor clip further comprising parallel linkage assembly including a first leg and a second leg each having upper and lower ends, each said first and second leg extending upwardly from, and having its lower end hingedly connected to, said outer surface of said base, said first leg being connected to said outer base surface so as to pivot about a first horizontal axis parallel to said rear end of said detector, said second leg being connected to said outer base surface so as to pivot about a second horizontal axis located on said base a fixed distance forward of said first axis, said parallel linkage assembly also including a clamp arm having a forward tip and a back end, said clamp arm being hingedly attached at its back end to said upper end of said first leg and being hingedly attached to said upper end of said second leg at a point on said arm displaced forwardly of the back end of said arm a distance equal to said fixed distance, whereby a parallelogram is formed by said legs and said base and said arm with said arm being maintained in parallel relationship with said base as it is movable toward and away from said base; and
   wherein the combined length of said arm an one of said legs is less than the length of said detector, and wherein the length of said arm is greater than the length of said base, whereby the tip of said arm cooperates with the upper top surface of said detector to clamp a visor therebetween to support said detector on said visor.

5. The combination of claim 4 further comprising means for biasing said linkage assembly forward and backward against said base.

6. The combination of claim 5 wherein said tip is angled forwardly and upwardly for causing said clamp arm to be urged backward and upward against the force of said biasing means when said combination is pushed forward onto said visor with said visor between said tip and the upper surface of said receiver.

7. A visor clip for securing a police radar detector to the underside of vehicle visors of a variety of thicknesses over a predetermined range, and wherein said detector has an upper planar top surface, a front end disposed to be oriented toward the front of said vehicle and a rear end, said surface extending the length of said detector between said ends, said clip comprising:

a base removably frictionally adapted to connect onto said upper top surface of said detector and having a front and a rear edge, said base adapted to be positionable on said top surface such that said edges lie between said ends and said surface extends forward of said rear edge at least a predetermined distance;

a parallel linkage assembly comprising first and second legs each having upper and lower ends, said first and second legs each hingedly connected at their lower end to and extending upwardly from an outer surface of said base, said lower end of said first leg being connected to said base at the rear edge thereof and said lower end of said second leg being connected to said base a fixed distance forward of said rear edge, and a clamp arm having a tip and a back end and a length greater than the length of said base between said edges of said base, said clamp arm being hingedly attached near its back end to said upper end of said first leg and being hingedly attached to said upper end of said second leg at a point on said arm displaced forwardly of the upper end of said first leg a distance equal to said fixed distance forward of the back end of said arm, whereby a parallelogram is formed by said legs and said base and said arm with said arm continuously maintained in parallel relationship with said base; and wherein the combined length of said arm and one of said legs is adapted to be less than the length of said detector and wherein the length of said arm is greater than the length of said base, whereby the tip of said arm is adapted to be cooperate with the upper surface of said detector to clamp a visor therebetween to support said detector thereon and to enhance said frictional connection between said base and said detector.

8. The combination of claim 7 further comprising means for biasing said linkage assembly forward and downward toward said base.

9. The combination of claim 7 wherein said biasing means is connected between said base and said first leg.

10. The clip of claim 9 wherein said tip is angled forwardly and upwardly for causing said clamp arm to be urged backward and upward against the force of said biasing means when said combination is pushed forward onto said visor with said visor between said tip and the upper surface of said receiver.

11. The clip of claim 10 further comprising a spring connected between said base and said linkage for urging said linkage forward and downward with respect to said base.

* * * * *